(12) United States Patent
Li et al.

(10) Patent No.: US 12,211,210 B2
(45) Date of Patent: Jan. 28, 2025

(54) VIDEO SEGMENTATION METHOD AND APPARATUS, ELECTRONIC DEVICE, AND COMPUTER-READABLE STORAGE MEDIUM

(71) Applicant: BOE TECHNOLOGY GROUP CO., LTD., Beijing (CN)

(72) Inventors: Peng Li, Beijing (CN); Wenjuan Li, Beijing (CN); Guangyu Shao, Beijing (CN); Shuyi Li, Beijing (CN); Yang Qin, Beijing (CN); Yongliang Han, Beijing (CN); Hong Wang, Beijing (CN); Yiming Lei, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 463 days.

(21) Appl. No.: 17/627,522

(22) PCT Filed: Mar. 29, 2021

(86) PCT No.: PCT/CN2021/083615
§ 371 (c)(1),
(2) Date: Jan. 14, 2022

(87) PCT Pub. No.: WO2021/197272
PCT Pub. Date: Oct. 7, 2021

(65) Prior Publication Data
US 2022/0270260 A1 Aug. 25, 2022

(30) Foreign Application Priority Data
Mar. 31, 2020 (CN) .......................... 202010247678.5

(51) Int. Cl.
*G06T 7/10* (2017.01)
*G06T 5/80* (2024.01)
*G06T 7/70* (2017.01)

(52) U.S. Cl.
CPC .................. *G06T 7/10* (2017.01); *G06T 5/80* (2024.01); *G06T 7/70* (2017.01); *G06T 2207/10016* (2013.01)

(58) Field of Classification Search
CPC ......... G06T 7/0006; G06T 7/001; G06T 7/70; H04N 23/90; H04N 23/62; H04N 23/695
See application file for complete search history.

(56) References Cited

U.S. PATENT DOCUMENTS

| 6,935,747 B2 * | 8/2005 | Westort ................. G02B 30/56 |
| | | 359/479 |
| 7,257,237 B1 * | 8/2007 | Luck ...................... G06T 7/251 |
| | | 382/103 |

(Continued)

FOREIGN PATENT DOCUMENTS

| CN | 102855111 A | 1/2013 |
| CN | 106020758 A | 10/2016 |

(Continued)

*Primary Examiner* — Yosef Kassa
(74) *Attorney, Agent, or Firm* — WHDA, LLP

(57) ABSTRACT

A video segmentation method and apparatus, an electronic device, and a computer-readable storage medium, related to the technical field of video processing. The method comprises: acquiring a video frame to be processed in a target-video, and information to be segmented in the video frame to be processed; determining a tilt angle corresponding to the video frame to be processed according to the information to be segmented; performing correction processing on the video frame to be processed according to the tilt angle, to obtain a corrected video frame; and performing image segmentation on the corrected video frame according to the information to be segmented, to determine an image to be played.

18 Claims, 9 Drawing Sheets

(56) References Cited

U.S. PATENT DOCUMENTS

| | | | | |
|---|---|---|---|---|
| 7,517,090 | B2* | 4/2009 | Vrachan | B29D 11/00596 |
| | | | | 353/77 |
| 7,688,221 | B2* | 3/2010 | Watanabe | G08G 1/166 |
| | | | | 348/148 |
| 7,855,544 | B1* | 12/2010 | Knauer | G01R 1/06766 |
| | | | | 324/149 |
| 8,233,033 | B2* | 7/2012 | Aarts | H05B 47/155 |
| | | | | 348/51 |
| 8,237,806 | B2* | 8/2012 | Tanaka | H04N 1/00488 |
| | | | | 348/207.1 |
| 8,575,554 | B2* | 11/2013 | Qian | A61B 6/037 |
| | | | | 600/436 |
| 8,792,039 | B2* | 7/2014 | Hirooka | G06T 5/80 |
| | | | | 348/333.03 |
| 8,935,082 | B2* | 1/2015 | Dalal | G08G 1/052 |
| | | | | 701/119 |
| 9,094,615 | B2* | 7/2015 | Aman | G06Q 30/02 |
| 9,131,146 | B2* | 9/2015 | Aono | H04N 23/695 |
| 9,876,993 | B2* | 1/2018 | Sablak | H04N 7/183 |
| 2013/0194292 | A1 | 8/2013 | Cho et al. | |
| 2017/0337028 | A1 | 11/2017 | Fan et al. | |

FOREIGN PATENT DOCUMENTS

| | | |
|---|---|---|
| CN | 106055299 A | 10/2016 |
| CN | 106502603 A | 3/2017 |

\* cited by examiner

VIDEO SEGMENTATION METHOD AND APPARATUS, ELECTRONIC DEVICE, AND COMPUTER-READABLE STORAGE MEDIUM

CROSS REFERENCE TO RELEVANT APPLICATIONS

This application is based upon and claims priority of the Chinese patent application filed on Mar. 31, 2020 filed to the Chinese Patent Office with the application number of 202010247678.5 and the title of "VIDEO SEGMENTATION METHOD AND APPARATUS, ELECTRONIC DEVICE, AND COMPUTER-READABLE STORAGE MEDIUM", the entire contents of which are incorporated herein by reference.

TECHNICAL FIELD

The disclosure generally relates to the technical field of video processing, in particular to a video segmentation method and apparatus, an electronic device, and a computer-readable storage medium.

BACKGROUND

The liquid crystal splicing markets has been gradually mature with the continuous progress of liquid crystal splicing technology; thus, the traditional splicing style has been difficult to meet the current fashion requirements of customers. The flexible splicing design of large screens may design various rules and irregular screen splicing shapes according to the users' creative to display colorful pictures, in order to better attract the audiences' attentions and achieve better publicity effect, and to better expand the application range of large screen splicing.

SUMMARY

The disclosure provides a video segmentation method and apparatus, an electronic device, and a computer-readable storage medium.

The disclosure provides a video segmentation method, comprising:
   acquiring a video frame to be processed in a target-video, and acquiring information to be segmented in the video frame to be processed;
   determining a tilt angle corresponding to the video frame to be processed, according to the information to be segmented;
   performing correction processing on the video frame to be processed according to the tilt angle, to obtain a corrected video frame; and
   performing image segmentation on the corrected video frame according to the information to be segmented, to determine an image to be played.

Optionally, acquiring the video frame to be processed in the target-video, and the information to be segmented in the video frame to be processed, comprises:
   acquiring placement information of at least one screen needed in playing the video frame to be processed; and
   determining an image to be segmented in the video frame to be processed, according to the placement information.

Optionally, determining the tilt angle corresponding to the video frame to be processed, according to the information to be segmented, comprises:
   obtaining the tilt angle corresponding to the video frame to be processed by calculating, according to vertex coordinates of two adjacent vertexes in the image to be segmented.

Optionally, performing correction processing on the video frame to be processed according to the tilt angle, to obtain a corrected video frame, comprises:
   performing a coordinate system transformation processing on the video frame to be processed to obtain a first converted video frame in a mathematical coordinate system, wherein the mathematical coordinate system takes the center of the image of the video frame to be processed as an origin;
   determining a point to be segmented in the first converted video frame, and a segmenting point coordinate corresponding to the point to be segmented, according to the information to be segmented and the first converted video frame;
   determining a video central point of the first converted video frame;
   performing rotation processing on the first converted video frame, according to the video central point and the tilt angle, to obtain the corrected video frame; and
   acquiring a corrected segmenting point corresponding to the point to be segmented in the corrected video frame, and a corrected coordinate corresponding to the corrected segmenting point.

Optionally, performing image segmentation on the corrected video frame according to the information to be segmented, to determine an image to be played, comprises:
   performing the coordinate system transformation processing on the corrected video frame to obtain a second converted video frame in an image coordinate system, wherein the image coordinate system takes the point of the upper left corner of the corrected video frame as an origin;
   determining a converted segmenting point corresponding to the corrected segmenting point in the second converted video frame and a converted coordinate corresponding to the converted segmenting point, according to the second converted video frame; and
   performing segmentation processing on the second converted video frame, according to the converted segmenting point and the converted coordinate to obtain the image to be played.

Optionally, performing rotation processing on the first converted video frame according to the video central point and the tilt angle, to obtain the corrected video frame, comprises:
   performing a rotation on the first converted video frame with the video central point as a rotation center and the tilt angle as a rotation angle, to obtain the corrected video frame.

Optionally, at least one edge of the image to be segmented of the corrected video frame is in a horizontal state.

Optionally, determining the image to be segmented in the video frame to be processed, according to the placement information, comprises:
   placing at least one screen, according to the placement information, to obtain an overlapping part between the video frame to be processed and the at least one screen, and regarding the overlapping part as the image to be segmented.

Optionally, after performing image segmentation on the corrected video frame according to the information to be segmented, to determine an image to be played, the method comprises:

acquiring the image to be played corresponding to each of the screens; and sending the image to be played corresponding to each of the screens to a terminal corresponding to the screen synchronously, to control, by the terminal, each of the screens to play the corresponding image to be played synchronously.

The disclosure provides a video segmentation apparatus, the apparatus comprises:

a video frame acquisition module, configured to acquire a video frame to be processed in a target-video, and information to be segmented in the video frame to be processed;

a tilt angle determination module, configured to determine a tilt angle corresponding to the video frame to be processed, according to the information to be segmented;

a corrected video frame acquisition module, configured to perform correction processing on the video frame to be processed according to the tilt angle, to obtain a corrected video frame; and an image to be played determination module, configured to perform image segmentation on the corrected video frame according to the information to be segmented, to determine an image to be played.

Optionally, the video frame acquisition module comprises:

a placement information acquisition unit, configured to acquire placement information of at least one screen needed in playing the video frame to be processed; and a segmented image determination unit, configured to determine an image to be segmented in the video frame to be processed according to the placement information.

Optionally, the tilt angle determination module comprises:

a tilt angle calculation unit, configured to obtain the tilt angle corresponding to the video frame to be processed by calculating, according to vertex coordinates of two adjacent vertexes in the image to be segmented.

Optionally, the corrected video frame acquisition module comprises:

a first converted frame acquisition unit, configured to perform a coordinate system transformation processing on the video frame to be processed to obtain a first converted video frame in a mathematical coordinate system, wherein the mathematical coordinate system takes the center of the image of the video frame to be processed as an origin;

a segmenting point coordinate determination unit, configured to determine a point to be segmented in the first converted video frame, and a segmenting point coordinate corresponding to the point to be segmented, according to the information to be segmented and the first converted video frame;

a video central point determination unit, configured to determine a video central point of the first converted video frame;

a corrected video frame acquisition unit, configured to perform rotation processing on the first converted video frame according to the video central point and the tilt angle, to obtain the corrected video frame; and a corrected coordinate acquisition unit, configured to acquire a corrected segmenting point corresponding to the point to be segmented in the corrected video frame, and a corrected coordinate corresponding to the corrected segmenting point.

Optionally, the image to be played determination module comprises:

a second converted frame acquisition unit, configured to perform the coordinate system transformation processing on the corrected video frame to obtain a second converted video frame in an image coordinate system, wherein the image coordinate system takes the point of the upper left corner of the corrected video frame as an origin;

a converted coordinate acquisition unit, configured to determine a converted segmenting point corresponding to the corrected segmenting point in the second converted video frame, and a converted coordinate corresponding to the converted segmenting point, according to the second converted video frame; and an image to be played acquisition unit, configured to perform segmentation processing on the second converted video frame, according to the converted segmenting point and the converted coordinate, to obtain the image to be played.

Optionally, the apparatus further comprises:

an image to be played acquisition module, configured to acquire the image to be played corresponding to each of the screens; and an image to be played sending module, configured to send the image to be played corresponding to each of the screens, to a terminal corresponding to the screen synchronously, and control, by the terminal, each of the screens to play the corresponding image to be played synchronously.

The disclosure provides an electronic device, wherein the device comprises:

a processor, a memory and a computer program stored in the memory and capable to be executed by the processor, and the computer program is executed by the processor to realize the video segmentation method according to any contents as mentioned above.

The disclosure provides a computer-readable storage medium, wherein the instruction stored in the computer-readable storage medium is executed by the processor in the electronic device, the electronic device is capable to perform the video segmentation method according to any contents as mentioned above.

The disclosure provides a computer program, comprising a computer-readable code, when the computer-readable code operates on the electronic device, the electronic device executes the video segmentation method according to any contents as mentioned above.

The above description is only an overview of the technical scheme of the disclosure. In order to better understand the technical means of the disclosure, the implementation may be carried out in accordance with the contents of the manual, and in order to make the aforesaid and other purposes, features and advantages of the disclosure more obvious and understandable, the specific implementation methods of the disclosure are given below.

BRIEF DESCRIPTION OF THE DRAWINGS

In order to more clearly illustrate the technical solutions of the embodiments of the present application or the prior art, the figures that are required to describe the embodiments or the prior art will be briefly introduced below. Apparently, the figures that are described below are embodiments of the present application, and a person skilled in the art may obtain other figures according to these figures without paying creative work.

DETAILED DESCRIPTION OF THE EMBODIMENTS

In order to make the objects, the features and the advantages of the embodiments of the present disclosure clearer, the technical solutions of the embodiments of the present disclosure will be clearly and completely described below with reference to the drawings of the embodiments of the present disclosure. Apparently, the described embodiments are merely certain embodiments of the present disclosure, rather than all of the embodiments. All of the other embodiments that a person skilled in the art obtains on the basis of the embodiments of the present disclosure without paying creative work fall within the protection scope of the present disclosure.

Figure 1:
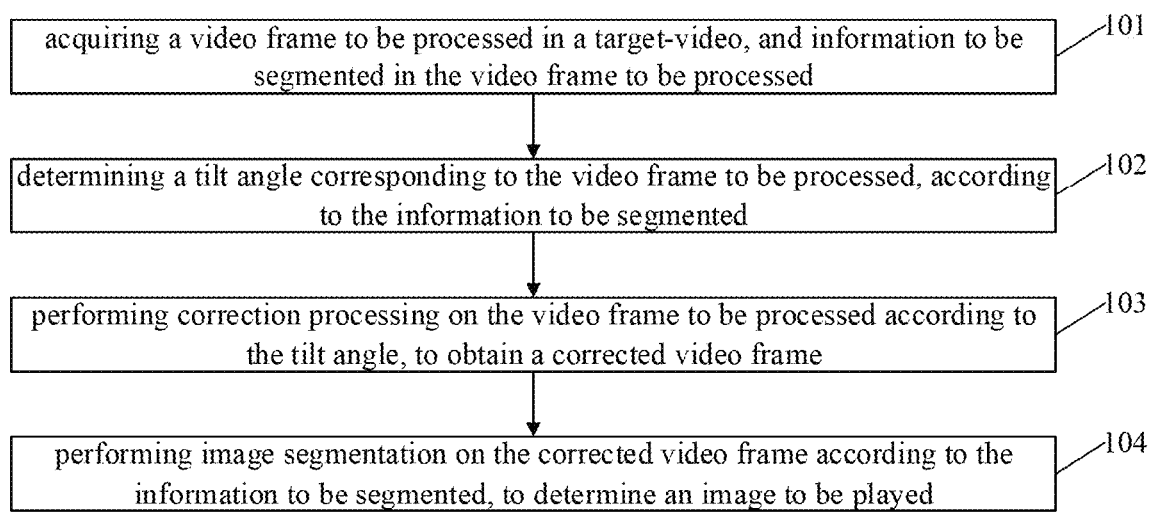
FIG. 1 illustrates a flow chart of the steps of a video segmentation method according to an embodiment of the disclosure.

Referring to FIG. 1, which illustrates a flow chart of the steps of a video segmentation method according to this embodiment of the disclosure, the video segmentation method may specifically include the following steps:

step 101: acquiring a video frame to be processed in a target-video, and information to be segmented in the video frame to be processed.

This embodiment of the disclosure may be applied to a scene of playing a segmented image of a video frame.

The target-video is a video used to play on a screen. In this embodiment, the target-video may be a short video, a drama, a film, or an image, etc. Specifically, it may be determined according to practical applications, which is not limited by this embodiment. The selection for a video frame to be processed may be referred in FIG. 8. For the video frames to be processed (video material 1 and video material 2 shown in FIG. 8), which may be dragged to the large rectangular box on the left side of FIG. 8, and then a screen is selected to play.

The video frame to be processed refers to a frame of image that is about to be played on the screen in the target-video and needs to be video segmented. For example, when the sixth frame in the target-video needs to be played, the sixth frame in the target-video may be used as the video frame to be processed.

The information to be segmented refers to the information in the video frame to be processed that needs to be played on the screen. It may be understood that this embodiment may be applied to the scene of video playing on the screen with special-shaped placement. The special-shaped placement is different from the conventional placement, it may be understood that the shape of the screen is generally rectangular or similar to the shape of rectangular, when the conventional placement is performed, one of the edges of the rectangular screen is horizontally set, and when the special-shaped placement is performed, one of the edges of the rectangular screen is tilted to the horizontal plane with a tilt angle. Due to the screen is tilted to a certain angle, in order to ensure that the user still sees the image horizontally presented, it is necessary to segment the image consistent with the screen tilt angle. Due to the difficulty of directly segmenting the tilt image, the image to be segmented may be rotated and then segmented. The screen with special-shaped placement is formed by the splicing of at least two screens with special-shaped placement. The information to be segmented indicates which part of the video frame to be processed needs to be played on the combined screen. For example, the combined screen is formed by four special-shaped screens, which are screen 1, screen 2, screen 3 and screen 4. The information to be segmented indicates the information of the video frame to be processed that needs to be played on screen 1, screen 2, screen 3 and screen 4 respectively.

It is understandable that the above examples are only examples listed in order to better understand the technical scheme of this embodiment of the disclosure, which is not the only limitation of this embodiment.

Figure 9:
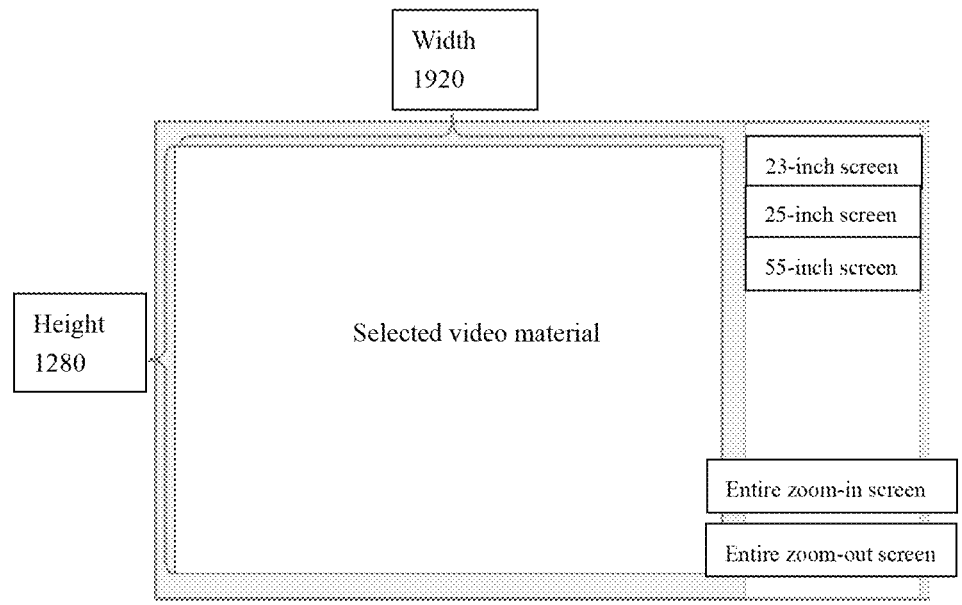
FIG. 9 illustrates a schematic diagram of a play screen selection according to an embodiment of the disclosure.

After acquiring the video frame to be processed, the screen that the video frame to be processed needs to play on may be selected. As shown in FIG. 9, the screen with different sizes may be selected on the left side and dragged onto the video material canvas, and the button of an entire zoom-out screen or an entire zoom-in screen may be clicked to select the appropriate screen.

After acquiring the video frame to be processed in the target-video and the screen to be played of the video frame to be processed, the information to be segmented in the video frame to be processed may be obtained by coordinate mapping. Specifically, it may be described in details in the following embodiments, which may not be repeated here in this embodiment.

When the target-video is sent to the screen for play, the video frame to be processed in the target-video and the information to be segmented in the video frame to be processed may be obtained.

After obtaining the video frame to be processed in the target-video and the information to be segmented in the video frame to be processed, step 102 is executed.

Step 102: determining a tilt angle corresponding to the video frame to be processed, according to the information to be segmented.

The tilt angle refers to the angle tilted of the representing image when the video frame to be processed is playing on a screen.

It is understandable that an image tilt may emerge, when a part of the images segmented from the video frame to be processed is played on the screen, and this step is to determine the tilt angle when the video frame to be processed is played on the screen, for subsequent tile correction procession.

After acquiring the information to be segmented in the video frame to be processed, the tilt angle corresponding to the video frame to be processed may be determined according to the information to be segmented. Specifically, vertex coordinates of two adjacent vertexes of the edge to be segmented may be determined according to the information to be segmented, and then the tilt angle is calculated by combining the two vertex coordinates.

After determining the tilt angle corresponding to the video frame to be processed according to the information to be segmented, step 103 is executed.

Step 103: performing correction processing on the video frame to be processed according to the tilt angle, to obtain a corrected video frame.

A corrected video frame refers to the video frame obtained after performing correction processing on the video frame to be processed according to the tilt angle, that is, the corrected video frame is the video frame which is displayed in a positive direction relative to the screen, so the tilt phenomenon may be avoided, when segmenting out part of images from the video frame and playing it on the screen.

After determining the tilt angle of the video frame to be processed, the video frame to be processed may be corrected according to the tilt angle to obtain the corrected video frame, specifically, according to the tilt angle, the video frame to be processed is rotated with the central point of the video frame to be processed, to obtain the corrected video frame.

After obtaining the corrected video frame, step 104 is executed.

Step 104: performing image segmentation on the corrected video frame according to the information to be segmented, to determine an image to be played.

The image to be played refers to the image to be played on the screen segmented from the corrected video frame. It is understandable that the image to be played on the screen may be segmented from the corrected video frame according to the information to be segmented, after correcting the video frame to be processed according to the tilt angle.

The video segmentation method provided by this embodiment of the disclosure includes, obtaining the video frame to be processed in the target-video, and the information to be processed in the video frame to be processed, determining the tilt angle corresponding to the video frame to be processed according to the information to be segmented, performing correction processing to the video frame to be processed according the tilt angle, to obtain the corrected video frame, and performing image segmentation to the corrected video frame according to the information to be segmented, to determine the image to be played. The correction processing to the video by the combination of the tilt angle in this embodiment of the disclosure, may avoid the image tilt phenomenon caused by the special-shaped splicing of different sizes of screens, thereby, improving the diversification and beauty of the screen.

Figure 2:
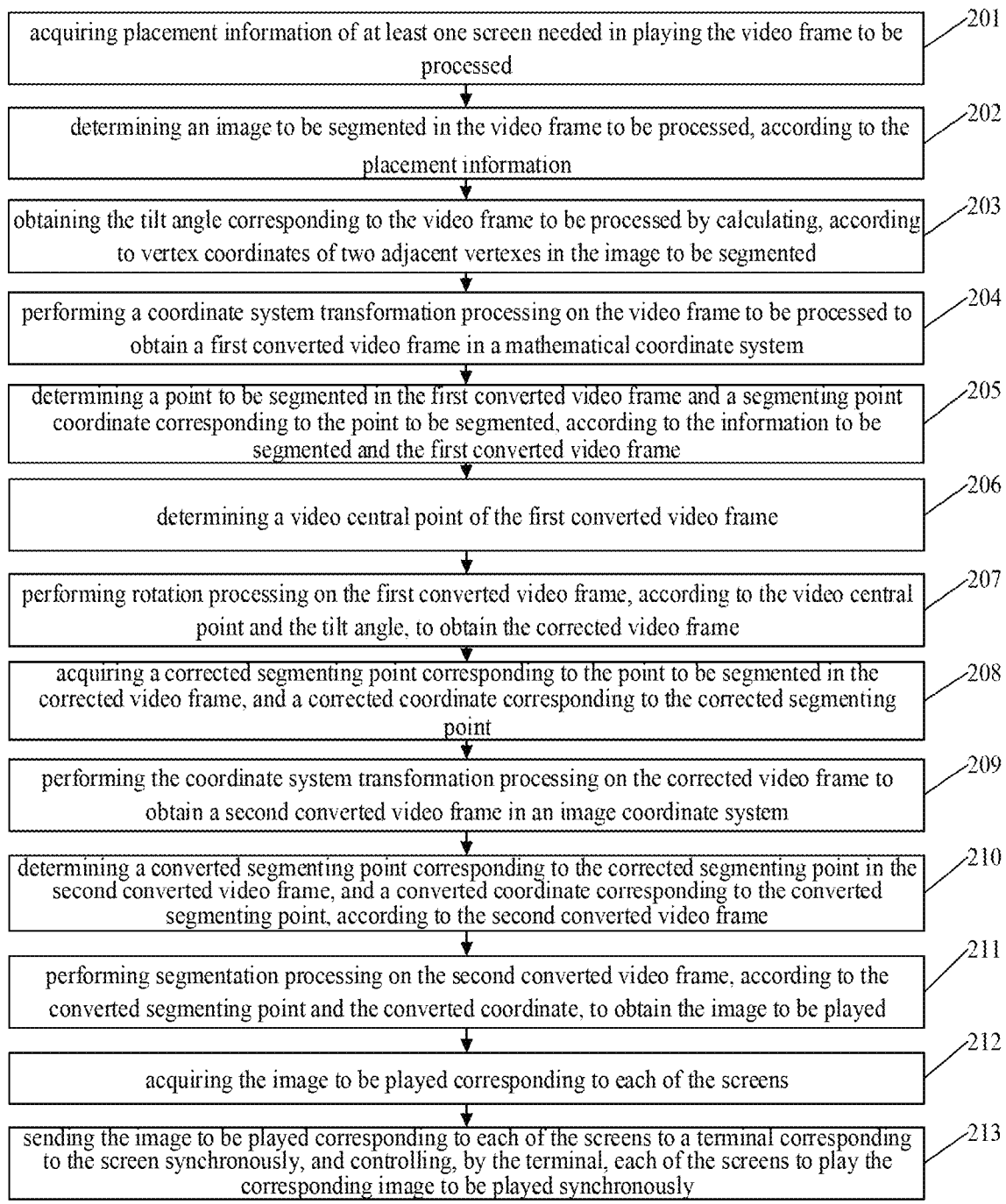
FIG. 2 illustrates a flow chart of the steps of another video segmentation method according to an embodiment of the disclosure.

With reference to FIG. 2, the flow chart of the steps of the video segmentation method provided by this embodiment of the disclosure is shown, the video segmentation method may specifically include the following steps:

step 201: acquiring placement information of at least one screen needed in playing the video frame to be processed.

This embodiment of the disclosure may be applied to a scene where an image segmented from a video frame is played.

The target-video refers to a video used to play on a screen. In this embodiment, the target-video may be a short video, a drama, a film, or an image, etc., specifically, it may depend on practical applications, which is not limited by this embodiment. The selection for the video frame to be processed may be shown in FIG. 8. For the video frames to be processed (video material 1 and video material 2 shown in FIG. 8), which may be dragged to the large rectangular box on the left side of FIG. 8, and then a screen is selected to play.

Figure 3:
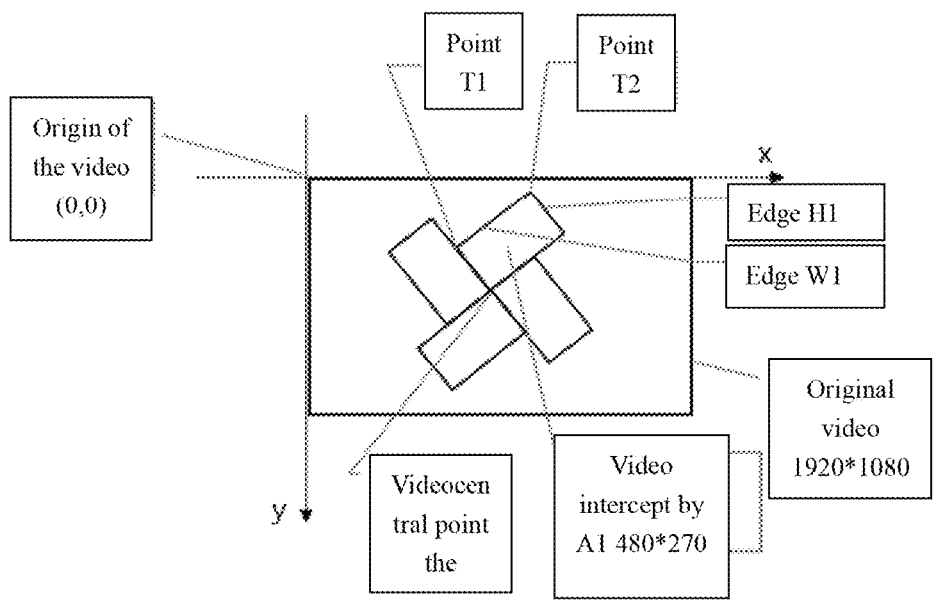
FIG. 3 illustrates a schematic diagram of a video image coordinate mapping according to an embodiment of the disclosure.

The placement information refers to the information of how to place the screen. In this embodiment, the screen used to play the target-video may be either one screen or at least two screens. This embodiment may be applied to a scene where the video is played on a special-shaped screen. The special-shaped placement is different from the conventional placement, it is understandable that the shape of the screen is generally rectangular or the shape similar to rectangular, one of the edges may be horizontally set during the conventional placement, and when the special-shaped placement is performed, one of the edges of the rectangular screen is tilted to the horizontal plane with a tilt angle. Due to the tilt of the screen, it is necessary to rotate and segment the video information, to ensure that the user sees the image still horizontally represented. For example, the four small square boxes shown in FIG. 3 are different small screens respectively, which may be combined by the way shown in FIG. 3 to form a combined screen. In this embodiment, the combined screen may be a screen formed by four screens, or the screen may be formed by five screens, specifically, it may depend on practical applications, which is not limited by this embodiment.

Figure 8:
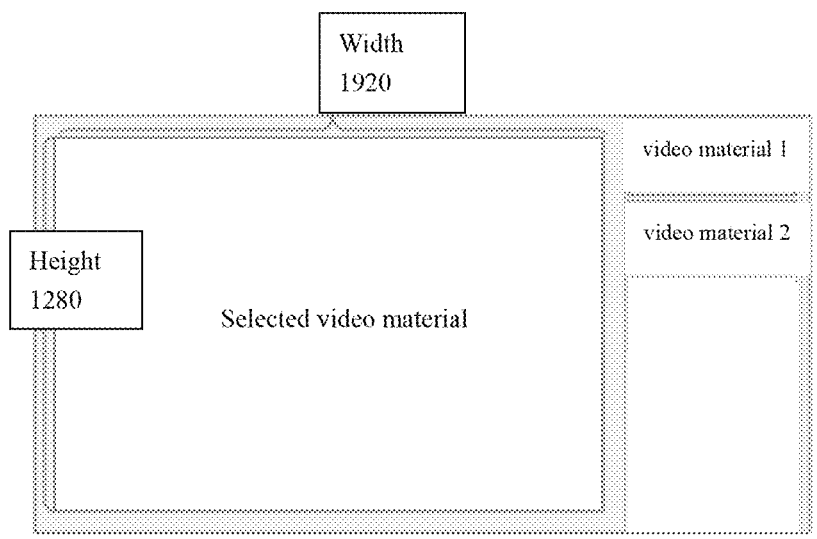
FIG. 8 illustrates a schematic diagram of a video material selection according to an embodiment of the disclosure.

In this embodiment, the video frame to be processed may be selected first, and then the screen that needs to play the video frame may be selected. As shown in FIG. 8. For the video frame that needs to be processed (video material 1 and video material 2 shown in FIG. 8), which may be dragged to the large rectangular box on the left side of FIG. 8 by dragging, and then the screen may be selected to play. The selection of the screen may be shown in FIG. 9, different sizes of screens may be selected on the left side, and may be dragged onto the video material canvas, and the button of an entire zoom out screen or an entire zoom in screen may be clicked to select the appropriate screen.

Figure 10:
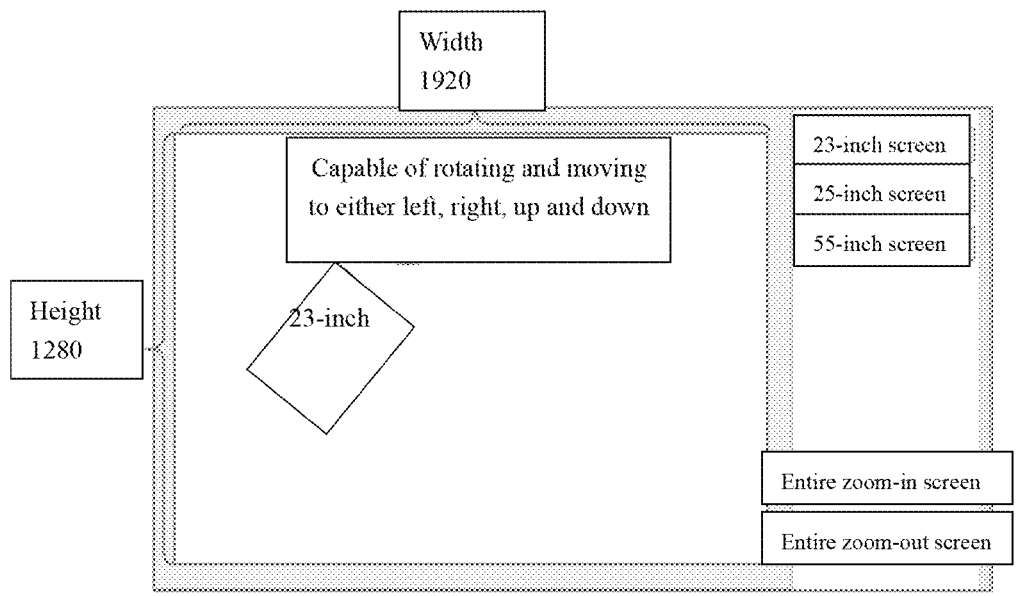
FIG. 10 illustrates a schematic diagram of a screen placement according to an embodiment of the disclosure.

After selecting the appropriate screen, the placement information of the screen may be obtained. It is certain that this embodiment does not limit the placement of the screen, the placement may be placed in any ways, such as the conventional placement, or rotation of a certain angle. As shown in FIG. 10, the screen may not be placed horizontally.

After obtaining the placement information of at least one placement screen required for the target-video, step 202 is executed.

Step 202: determining an image to be segmented in the video frame to be processed, according to the placement information.

The video frame to be processed refers to a frame of image of the target-video that is about to be played on a special-shaped splicing screen, which needs to be segmented. For example, when the sixth frame of the target-video is needed to be played, the sixth frame in the target-video may be used as the video frame to be processed.

The image to be segmented is a video image segmented from the video frame to be processed and used to be played on at least one screen. It may be understood that the special-shaped screen is combined by at least two screens, and the image to be segmented indicates which part of the video frame to be processed needs to be played on the screen. For example, the special-shaped placement of the screen is formed by four screens, which are respectively screen 1, screen 2, screen 3 and screen 4, the image to be segmented indicates the images of the video frame to be processed need to be played on screen 1, screen 2, screen 3 and screen 4 respectively.

Figure 11:
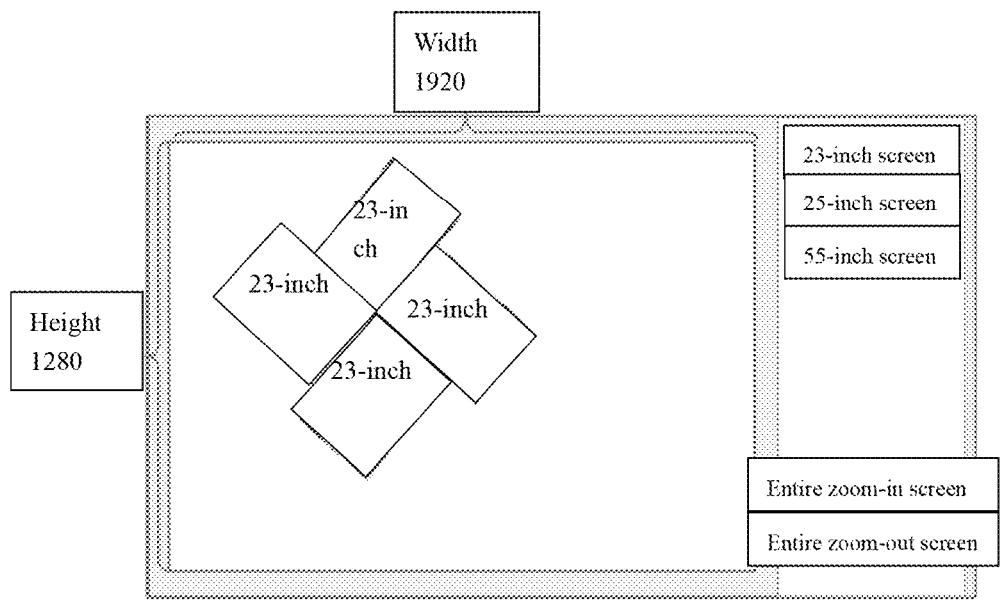
FIG. 11 illustrates a schematic diagram of a screen splicing according to an embodiment of the disclosure.

In this embodiment, the image to be segmented in the video frame to be processed may be determined by video frame mapping. As shown in FIG. 11, the screen with special-shaped placement may be placed in the left rectangular box, and then the overlapping part between the video frame to be processed and the screen with special-shaped placement may be obtained as the image to be segmented. Alternatively, as shown in FIG. 3, the original video is a large box with 1920*1080 pixels, A1 is the video frame to be intercepted (as the video frame to be processed), and the video pixel is 480*270. The four small boxes in the A1 is a screen formed by four screens. When the video frame to be processed needs to be segmented, the video frame to be processed may be mapped to the combined screen according to the image coordinate system, to determine the image to be segmented in the video frame to be processed.

It is understandable that the above examples are only examples listed in order to better understand the technical scheme of this embodiment of the disclosure, which is not the only limitation of this embodiment.

After determining the image to be segmented in the video frame to be processed, step 203 is executed.

Step 203: obtaining the tilt angle corresponding to the video frame to be processed by calculating, according to vertex coordinates of two adjacent vertexes in the image to be segmented.

After obtaining the placement information of the screen with special-shaped placement, the coordinates of two adjacent vertices on the screen may be obtained according to the placement information. As shown in FIG. 3, the two adjacent vertices, which are point T1 and point T2, may be obtained according to the combination information. It is certain that other two adjacent vertices may be used rather than these two points, specifically, it may be determined according to business requirements. This embodiment does not limit this.

After obtaining two adjacent vertices on the screen with special-shaped placement, the coordinates of the two vertices in the image coordinate system may be obtained, that is, the coordinates of the two vertices. As shown in FIG. 3, in the image coordinate system, the coordinate system is established with the vertex of the upper left corner of the image as the origin, and the coordinate of the origin is (0,0). Then, according to the placement information, the vertex coordinates of the two adjacent vertices on the screen with special-shaped placement may be calculated.

After obtaining the vertex coordinates of two adjacent vertices, the tilt angle may be calculated according to the coordinates of these two vertices. In this embodiment, the method of calculating the tilt angle by the two-points is used to calculate, which is not repeated here in the embodiment for the specific calculation method.

Step 204: performing a coordinate system transformation processing on the video frame to be processed to obtain a first converted video frame in a mathematical coordinate system, wherein the mathematical coordinate system takes the center of the image of the video frame to be processed as an origin.

The first converted video frame refers to the video frame in the mathematical coordinate system obtained after the coordinate system transformation processing on the video frame to be processed. For the video, the image coordinate in the video frame takes the upper left corner of the image of the video frame as the origin. It is necessary to rotate with the center of the image of the video frame as the origin during rotating. Therefore, it is necessary to perform the coordinate transformation and reestablish a mathematical coordinate axis with the image center of the video frame as the origin.

After performing the coordinate system transformation processing on the video frame to be processed to obtain the first converted video frame in the mathematical coordinate system, step 205 is executed.

Step 205: determining a point to be segmented in the first converted video frame, and a segmenting point coordinate corresponding to the point to be segmented, according to the information to be segmented and the first converted video frame.

The point to be segmented is an edge point that needs to be segmented in the first converted video frame. The segmenting point coordinate is the coordinate corresponding to the point to be segmented, that is, the coordinate in the mathematical coordinate system.

Figure 4:
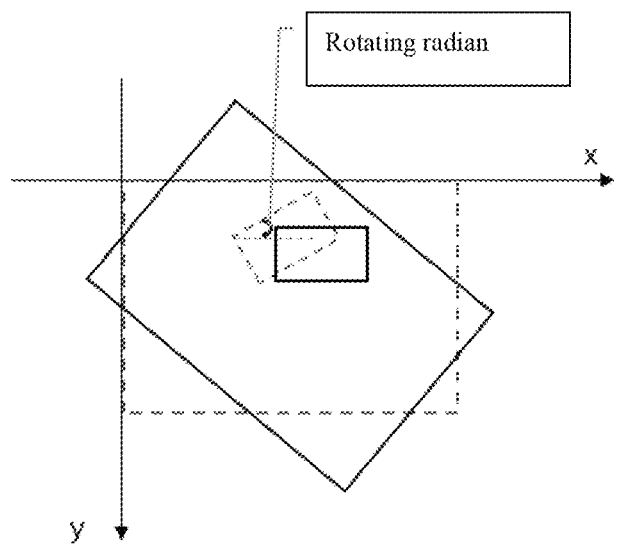
FIG. 4 illustrates a schematic diagram of a video image rotation according to an embodiment of the disclosure.

In the above steps, the information to be segmented in the video frame to be processed is obtained. After performing the coordinate system transformation processing on the video frame to be processed, the coordinates of each of the points are changed. At this time, it is necessary to determine the point to be segmented in the first video frame and the segmenting point coordinate corresponding to the point to be segmented after conversion, according to the information to be segmented. At present, the coordinates of the video frame to be processed are in the image coordinate system. It is necessary to perform the coordinate system transformation processing on the video frame to be processed. As shown in FIG. 4, the downward direction of the source video coordinate system is the positive direction of the y-axis, and the rightward direction is the positive direction of the x-axis. The coordinate system is converted, the upward direction is the positive direction of the $y^1$-axis and the rightward direction is the positive direction of the $x^1$-axis. The coordinate value of T1 point shown in FIG. 3 is (x1, y1) in the video coordinate system. Now it is necessary to convert T1 point to the mathematical coordinate system with the video central point as (0,0) point. At this time, the converted coordinate of T1 point is (X, Y), X=x1−w1/2, Y=−(y1−h1/2), wherein w1 is the width of the video frame to be processed and h1 is the height of the video frame to be processed.

After determining the point to be segmented in the first converted video frame, and the segmenting point coordinate corresponding to the point to be segmented, according to the information to be segmented and the conversion result, step 206 is executed.

Step 206: determining a video central point of the first converted video frame.

The video central point is the origin of the video center, it is understandable that in the image coordinate system, the video central point is the point of the upper left corner, which is used as the origin for calculation, and in the mathematical coordinate system, the video central point is calculated with the video frame center as the origin, which is used as the video central point. For the video, the image coordinate in the video frame takes the point of the upper left corner of the image of the video frame as the origin. It is necessary to rotate with the center of the image of the video frame as the origin during rotating. Therefore, it is necessary to perform the coordinate transformation and reestablish a mathematical coordinate axis with the image center of the video frame as the origin.

Figure 5:
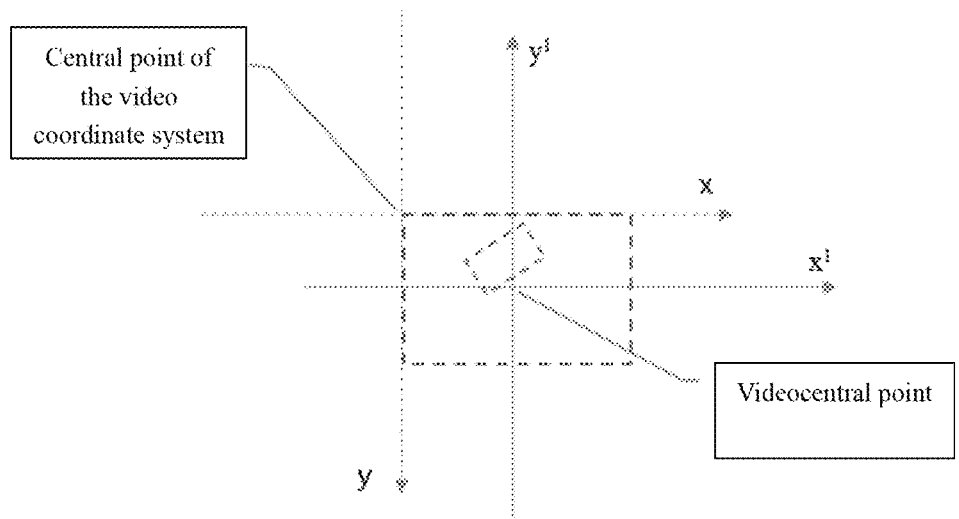
FIG. 5 illustrates a schematic diagram of a video image coordinate rotation according to an embodiment of the disclosure.

After performing coordinate system transformation processing on the video frame to be processed to obtain the first converted video frame in the mathematical coordinate system, the video central point of the first converted video frame may be determined. As shown in FIG. 5, after converting the video frame to be processed into the first converted video frame in the mathematical coordinate system, the central point of the first converted video frame may be obtained as the video central point.

After determining the video central point of the first converted video frame, step 207 is executed.

Step 207: performing rotation processing on the first converted video frame, according to the video central point and the tilt angle, to obtain the corrected video frame.

The corrected video frame refers to the video frame obtained by performing correction processing on the video frame to be processed according to the tilt angle, that is, the image to be segment in the video frame to be processed is rotated with the tilt angle, so that at least one side of the image to be segmented is in a horizontal state in the corrected video frame. The corrected video frame is the video frame represented in the positive direction relative to the combined screen.

Figure 6:
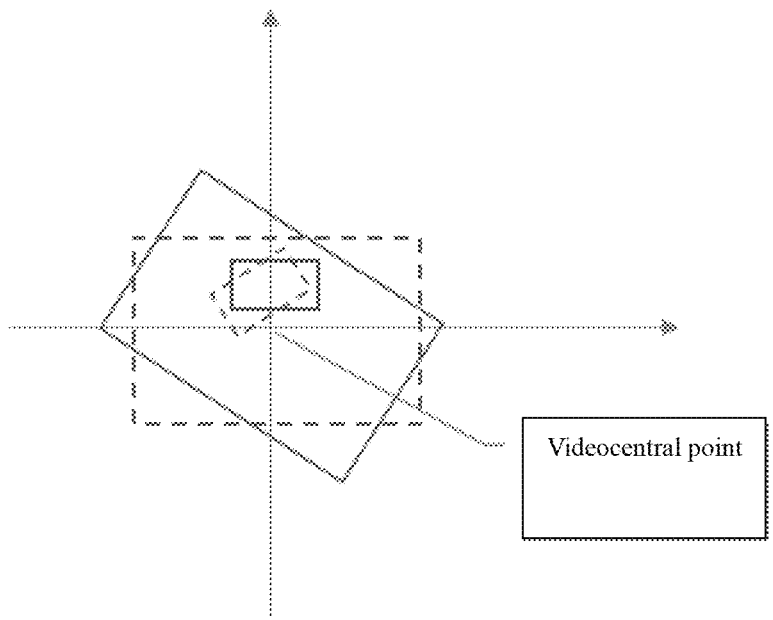
FIG. 6 illustrates a schematic diagram of a new video image coordinate according to an embodiment of the disclosure.

After determining the video central point, performing rotation processing on the first converted video frame according to the video central point and the tilt angle to obtain the corrected video frame. As shown in FIG. 5, the video frame is rotated based on the video central point, and the rotation angle is the tilt angle. After the rotation is completed, the corrected video frame may be obtained. Specifically, as referring to FIG. 3 to FIG. 6, the long side of the square frame may be rotated to a horizontal state with the rotation angle. As shown in FIG. 4, the position of the square frame is the image to be segmented. At this time, the rotation angle $P1=\arctan((y2-y1)*(-1)/(x2-x1))$. As shown in FIG. 5, the rotating video is rotated based on the video central point. As shown in FIG. 6, after rotating the video frame, the new coordinate of T1 point shown in FIG. 3 is $(x3, y3)$, $x3=\cos(P1)*X-\sin(P1)*Y$, $y3=\cos(P1)*X+\sin(P1)*Y$, wherein X is the abscissa of T1 point before the rotating in the mathematical coordinate system, Y is the ordinate of T1 point before the rotating in the mathematical coordinate system, P1 is the angle of rotation (which is the tilt angle).

It is understandable that the above examples are only examples to better understand the technical scheme of this embodiment of the disclosure, which are not limited to this embodiment.

After obtaining the corrected video frame, step 208 is executed.

Step 208: acquiring a corrected segmenting point corresponding to the point to be segmented in the corrected video frame, and a corrected coordinate corresponding to the corrected segmenting point.

The corrected segmenting point is the corrected segmented point corresponding to the point to be segmented in the corrected video frame. The correction coordinate is the coordinate corresponding to the corrected segmenting point, which is the coordinate value in the mathematical coordinate system.

After the corrected video frame is obtained, the corrected segmenting point corresponding to the point to be segmented in the corrected video frame, and the corrected coordinate corresponding to the corrected segmenting point may be obtained. Specifically, it may be the same as the content described in step 207.

After obtaining the corrected segmenting point corresponding to the point to be segmented in the corrected video frame, and the corrected coordinate corresponding to the corrected segmenting point, step 209 is executed.

Step 209: performing a coordinate system transformation processing on the corrected video frame to obtain a second converted video frame in the image coordinate system, wherein the image coordinate system takes the point of the upper left corner of the corrected video frame as an origin.

After obtaining the corrected video frame, it is necessary to perform a coordinate system transformation processing on the corrected video frame, so that the second converted video frame in the image coordinate system may be obtained, that is, the coordinate origin of the second converted video frame is the point of the left upper corner of the video frame. For example, the new coordinate of T1 point shown in FIG. 3 obtained after performing a secondary coordinate system transformation processing is $(X1, Y1)$, $X1=x3+w1/2$, $Y1=-(y3-h1/2)$, wherein, x3 is the abscissa of T1 point shown in FIG. 3 in the mathematical coordinate system after rotation, y3 is the ordinate of T1 point shown in FIG. 3 in the mathematical coordinate system after rotation, w1 is the width of the video frame to be processed as shown in FIG. 3 and h1 is the height of the video frame to be processed as shown in FIG. 3.

It is understandable that when doing video segmentation, it is necessary to segment based on the image coordinate system. Therefore, it is necessary to perform a second conversion processing, that is, the video frame is converted from the mathematical coordinate system to the image coordinate system again.

After obtaining the second converted video frame in the image coordinate system, step 210 is executed.

Step 210: determining the converted segmenting point corresponding to the corrected segmenting point in the second converted video frame, and the converted coordinate corresponding to the converted segmenting point, according to the second converted video frame.

The converted segmenting point refers to the segmenting point corresponding to the corrected segmenting point in the second converted video frame, and the converted coordinate refers to the coordinate value corresponding to the converted segmenting point in the image coordinate system.

After obtaining the second converted video frame in the image coordinate system, according to the conversion results, the converted segmenting point corresponding to the corrected segmenting point in the second converted video frame may be obtained, and the converted coordinate of the converted segmenting point in the image coordinate system may be obtained. For example, the new point coordinate of T1 point as shown in FIG. 3 obtained after performing a secondary coordinate system transformation processing is (X1, Y1), X1=x3+w1/2, Y1=−(y3−h1/2), wherein x3 is the abscissa of T1 point as shown in FIG. 3 in the mathematical coordinate system after rotating, y3 is the ordinate of T1 point as shown in FIG. 3 in the mathematical coordinate system after rotation, w1 is the width of the video frame to be preserved as shown in FIG. 3, and h1 is the length of the video frame to be processed as shown in FIG. 3.

After obtaining the converted segmenting point and the converted coordinate corresponding to the converted segmenting point, step 211 is executed.

Step 211: performing segmentation processing on the second converted video frame, according to the converted segmenting point and the converted coordinate, to obtain the image to be played.

The image to be played refers to the image segmented from the second converted video frame and played on the screen with special-shaped placement. It is understandable that after correcting the video frame to be processed according to the tilt angle, and performing the coordinate system transformation again to obtain the second converted video frame in the image coordinate system. According to the converted segmenting point and the converted coordinate, the image needed to play on the screen with special-shaped placement may be segmented from the second conversion video frame.

After obtaining the second converted video frame, the second converted video frame may be segmented according to the converted segmenting point and the converted coordinate to obtain the image to be played. Specifically, the video may be segmented by FFmpeg and other tools. The starting coordinate point of the segment may be the calculated Tn point (which is the point (X1, Y1) after the conversion of T1 point as shown in FIG. 3), the width of the segment is W1, and the height is H1 (which is the width W1 of the video A1 needed to be intercepted as shown in FIG. 3, and the height H1 of the video A1 as shown in FIG. 3), so that the video frame after segmentation and the image to be played may be obtained.

After performing segmentation processing on the second converted video frame according to the converted segmenting point and converted coordinate to obtain the image to be played, step 212 is executed.

Step 212: acquiring the image to be played corresponding to each of the screens.

It is understandable that the combined screen is formed by a plurality of screens, and after performing image segmentation to the video frame to be processed is completed, the image to be played corresponding to each of the screens may be obtained, and then step 213 is executed.

Step 213: sending the image to be played corresponding to each of the screens, to a terminal corresponding to the screen synchronously, to control, by the terminal, each of the screens to play the corresponding image to be played synchronously.

Figure 7:
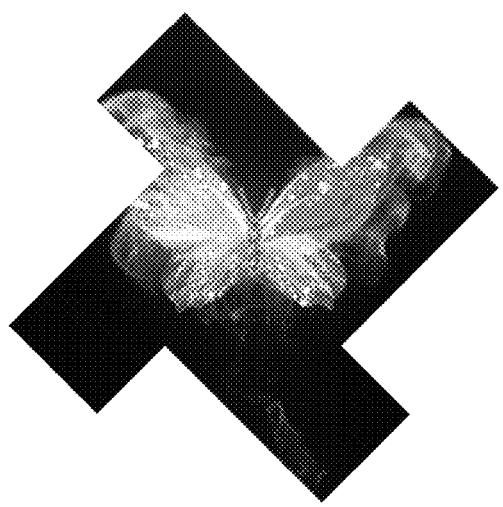
FIG. 7 illustrates a schematic diagram of a special-shaped segmenting effect according to an embodiment of the disclosure.

After acquiring the image to be played corresponding to each of the screens, the image to be played corresponding to each of the screens may be synchronously sent to the terminal corresponding to the screen, to control each of the screens to play the image to be played corresponding to each of the screens by the terminal synchronously, to realize the video splicing as shown in FIG. 7.

The scheme provided by this embodiment is to rotate the screen to the angle needed to be placed, so as to ensure that the visual effect of the video is consistent with the visual effect before the video is segmented when the video is played, a plurality of screens with special-shaped placement are spliced together to download the corresponding video content, which may realize the effect of the splicing with special-shaped.

The video segmentation method provided in this embodiment includes obtaining the video frame to be processed in the target-video, and the information to be segmented in the video frame to be processed, determining the tilt angle corresponding to the video frame to be processed according to the information to be segmented. The corrected video frame is obtained by performing correction processing on the video frame to be processed according to the tilt angle.

The image to be played is determined by performing image segmentation on the corrected video frame according to the information to be segmented. By combining the tilt angle to perform correction processing on the video in this embodiment of the disclosure, which may avoid the image tilt phenomenon caused by the abnormal splicing of different sizes of screens. Thus, improving the diversification and beauty of the screen.

Figure 12:
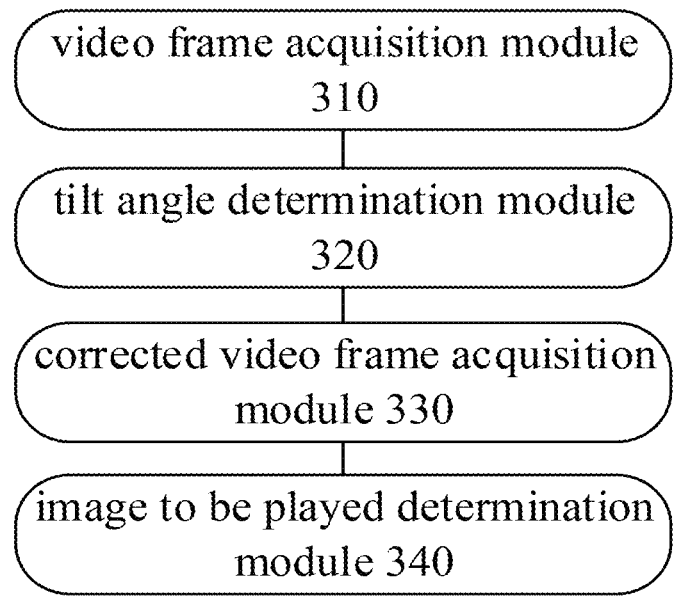
FIG. 12 illustrates a structural diagram of a video segmentation apparatus according to an embodiment of the disclosure.

With reference to FIG. 12, a structural diagram of a video segmentation apparatus provided by this embodiment of the disclosure is illustrated. The video segmentation apparatus may specifically include the following modules:

a video frame acquisition module 310, configured to acquire a video frame to be processed in a target-video, and information to be segmented in the video frame to be processed;

a tilt angle determination module 320, configured to determine a tilt angle corresponding to the video frame to be processed, according to the information to be segmented;

a corrected video frame acquisition module 330, configured to perform correction processing on the video frame to be processed according to the tilt angle, to obtain a corrected video frame; and an image to be played determination module, configured to perform image segmentation on the corrected video frame according to the information to be segmented, to determine an image to be played.

The video segmentation apparatus provided by this embodiment, by obtaining the video frame to be processed in the target-video, and the information to be segmented in the video frame to be processed, determining the tilt angle corresponding to the video frame to be processed according to the information to be segmented, performing correction processing to the video frame to be processed according to the tilt angle, to obtain the corrected video frame, and determining the image to be played by performing image segmentation to the corrected video frame according to the information to be segmented. By combining the tilt angle to perform correction processing to the video in this embodiment of the disclosure, which may avoid the image tilt phenomenon caused by the abnormal splicing of different sizes of screens. Thus, improving the diversification and beauty of the screen.

Figure 13:
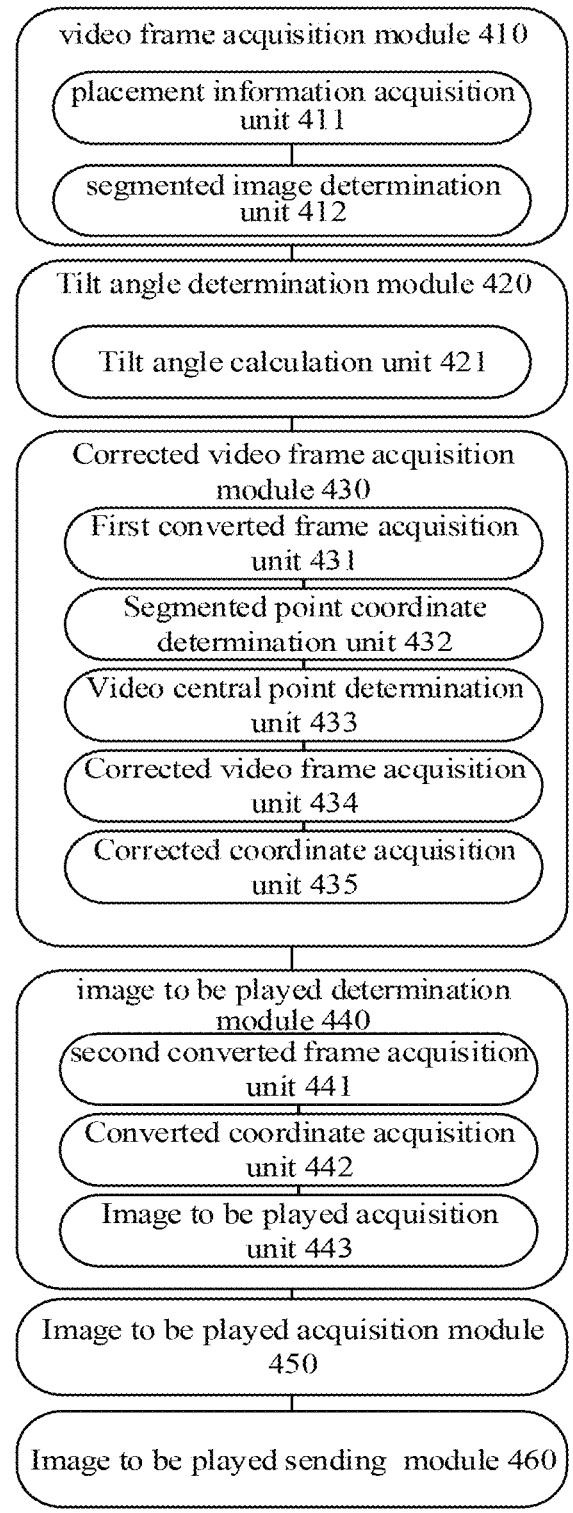
FIG. 13 illustrates a structural diagram of another video segmentation apparatus according to an embodiment of the disclosure.

With reference to FIG. 13, which illustrates a structural diagram of a video segmentation apparatus according to this embodiment of the disclosure, the video segmentation apparatus may specifically include the following modules:

a video frame acquisition module 410, configured to acquire a video frame to be processed in a target-video, and information to be segmented in the video frame to be processed;

a tilt angle determination module 420, configured to determine a tilt angle corresponding to the video frame to be processed, according to the information to be segmented;

a corrected video frame acquisition module 430, configured to perform correction processing on the video frame to be processed according to the tilt angle, to obtain a corrected video frame;

an image to be played determination module 440, configured to perform image segmentation on the corrected video frame according to the information to be segmented, to determine an image to be played;

an image to be played acquisition module 450, configured to obtain the image to be played corresponding to each of the screens; and an image to be played sending module 460, configured to send the image to be played corresponding to each of the screens to a terminal corresponding to the screen synchronously, to control, by the terminal, each of the screens to play the corresponding image to be played synchronously.

Optionally, the video frame acquisition module 410 includes:

a placement information acquisition unit 411, configured to acquire the placement information of at least one of the screens that needed to play the video frame to be processed.

a segmented image determination unit 412, configured to according to the placement information, determine the image to be segmented in the video frame to be processed.

Optionally, the tilt angle determination module 420 includes:

a tilt angle calculation unit 421, configured to according to vertex coordinates of two adjacent vertexes in the image to be segmented, obtain the tilt angle corresponding to the video frame to be processed by calculating.

Optionally, the corrected video frame acquisition module 430 includes:

a first converted frame acquisition unit 431, configured to perform a coordinate system transformation processing on the video frame to be processed to obtain a first converted video frame in a mathematical coordinate system, wherein the mathematical coordinate system takes the center of the image of the video frame to be processed as an origin a segmenting point coordinate determination unit 432, configured to determine a point to be segmented in the first converted video frame, and a segmenting point coordinate corresponding to the point to be segmented, according to the information to be segmented and the first converted video frame;

a video central point determination unit 433, configured to determine a video central point of the first converted video frame;

a corrected video frame acquisition unit 434, configured to perform rotation processing on the first converted video frame according to the video central point and the tilt angle, to obtain the corrected video frame; and a corrected coordinate acquisition unit 435, configured to acquire a corrected segmenting point corresponding to the point to be segmented in the corrected video frame, and a corrected coordinate corresponding to the corrected segmenting point.

Optionally, the image to be played determination module 440 includes:

a second converted frame acquisition unit 441, configured to perform a coordinate system transformation processing on the corrected video frame to obtain a second converted video frame in an image coordinate system, wherein the image coordinate system takes the point of the upper left corner of the corrected video frame as an origin;

a converted coordinate acquisition unit 442, configured to determine a converted segmenting point corresponding to the corrected segmenting point in the second converted video frame, and a converted coordinate corresponding to the converted segmenting point, according to the second converted video frame; and an image to be played acquisition unit 443, configured to perform segmentation processing, on the second converted video frame, according to the converted segmenting point and the converted coordinate, to obtain the image to be played.

The video segmentation apparatus provided by this embodiment, by obtaining the video frame to be processed in the target-video, and the information to be segmented in the video frame to be processed, determining the tilt angle corresponding to the video frame to be processed according to the information to be segmented, performing correction processing on the video frame to be processed according to the tilt angle, to obtain the corrected video frame, determining the image to be played by performing image segmentation on the corrected video frame according to the information to be segmented. By combining the tilt angle to perform correction processing to the video in this embodiment of the disclosure, which may avoid the image tilt phenomenon caused by the abnormal splicing of different sizes of screens. Thus, improving the diversification and beauty of the screen.

For the foregoing embodiments of the method, for the sake of simple description, which are expressed as a series of action combinations, but technical personnel in the field should be aware that this disclosure is not limited by the sequence of actions described, because certain steps may be performed in other sequences or simultaneously according to this disclosure. Secondly, technical personnel in this field may also be aware that all embodiments described in the specification are preferred embodiments, the actions and modules involved are not necessarily required by this disclosure.

Furthermore, this embodiment of the disclosure further provides an electronic device, comprises: a processor, a memory and a computer program stored in the memory and capable to be executed by the processor, and the computer program is executed by the processor to realize the video segmentation method according to any one of the above mentioned.

This embodiment of the disclosure further provides a computer-readable storage medium, wherein the instruction stored in the computer-readable storage medium is executed by the processor in the electronic device, the electronic device is capable to perform the video segmentation method according to any one of the above mentioned.

The apparatus implementation cases described above are only schematic, in which the units described as the separation components may be or may not be physically separated, and the shown as units may be or may not be physical units, that is, they may be located in one place or may be distributed to multiple network units. Some or all of the modules may be selected according to the actual needs to achieve the purpose of this implementation scheme. Ordinary technicians in this field may understand and implement without paying creative labor.

The implementation examples of each component in this paper may be realized by hardware, or by software modules running on one or more processors, or by their combination.

Technicians in this field should understand that microprocessors or digital signal processors (DSP) may be used in practice to achieve some or all of the functions of some or all parts of the display device according to this public embodiment. This disclosure may also be implemented as part or all of the equipment or apparatus used to implement the method described here (for example, computer programs and computer program products). This open program may be stored in a computer readable medium, or may have one or more signals. Such signals may be downloaded from the Internet site, or provided on the carrier signal, or provided in any other form.

Figure 14:
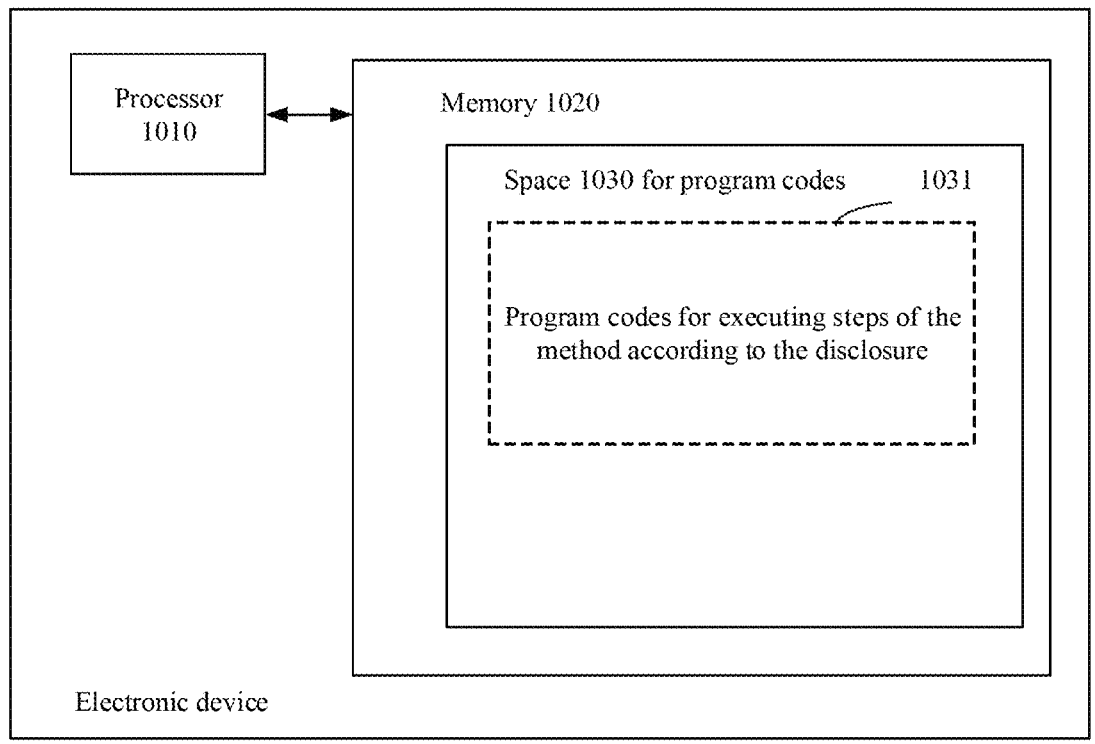
FIG. 14 illustrates a block diagram of an electronic device used to execute the method according to the disclosure.
Figure 15:
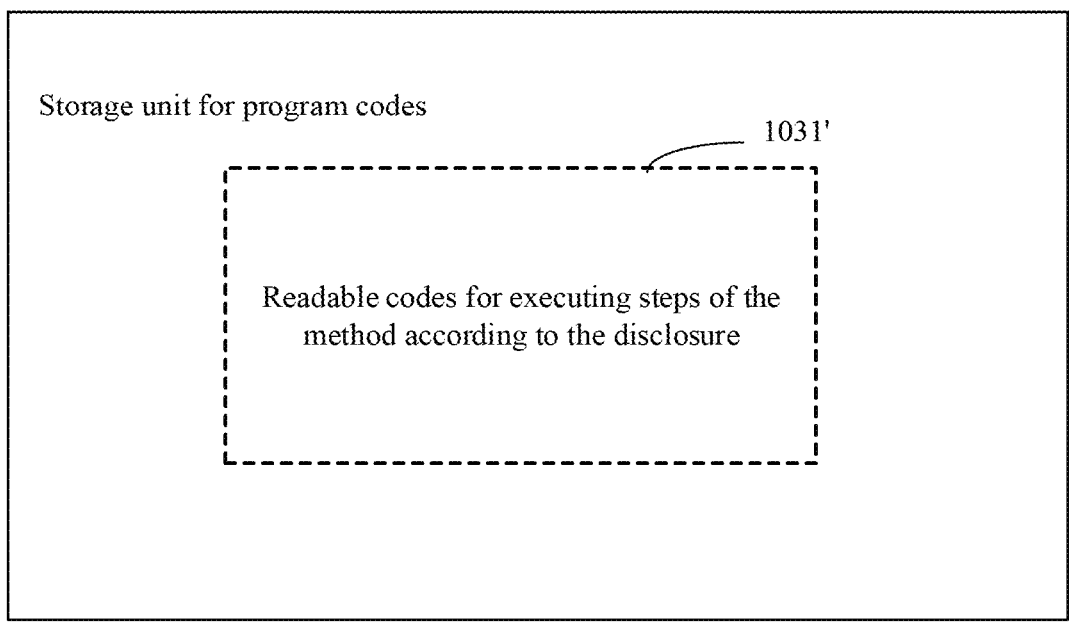
FIG. 15 illustrates a storage unit used to maintain or carry the program code for achieving the method according to the disclosure.

For example, FIG. 14 shows an electronic device that may implement the method exposed according to this. The electronic device traditionally includes a processor 1010 and a computer program product or computer readable medium in the form of memory 1020. Memory 1020 may be an electronic memory such as flash memory, EEPROM (electrically erasable programmable Read-only memory), EPROM, hard disk, or ROM. Memory 1020 has storage 1030 for program code 1031 for performing any of the method steps described above. For example, storage 1030 for program code could include individual program code 1031 for implementing the various steps in the method above. The program code may be read from or written to one or more computer program products. These computer program products include program code carriers such as hard disks, compact disks (CDS), memory cards, or floppy disks. Such computer program products are usually portable or stationary storage units as described in FIG. 15. The storage unit may have segments, storage space, and so on arranged in a manner similar to memory 1020 in the display device in FIG. 14. The program code may, for example, be compressed in an appropriate form. Typically, the storage unit includes computer-readable code 1031', that is, code that may be read by a processor such as 1010, which, when run by a display unit, causes the display unit to perform the steps in the method described above.

In the instructions provided here, a large number of specific details are explained. However, it is understandable that this public implementation case may be practiced without these specific details. In some examples, the notified methods, structures and technologies are not shown in detail, so that the understanding of this specification is not blurred.

All embodiments in this manual are described in a progressive manner. Each embodiment focuses on the differences with other embodiments, and the same and similar parts among all embodiments may be referred to each other.

Finally, it should be noted that, in this article, relational terms such as first and second are used only to distinguish one entity or operation from another, and do not necessarily require or imply any such actual relationship or order between these entities or operations. Also, the term "comprise" and "include" or any of its other variants is intended to cover a non-exclusive contain, which enables the process, method, product or equipment including a series of elements to include not only those elements, but also include other elements not list clearly, or also include inherent elements for the process, method, product or equipment. Without further restriction, the element defined by the statement "includes a . . . " does not exclude the existence of other identical elements in the process, method, goods or equipment that includes the element.

A video segmentation method, a video segmentation apparatus, an electronic device, and a computer-readable storage medium provided by this disclosure are introduced in detail above. In this paper, the principle and implementation of this disclosure are described with specific examples. The description of the above implementation examples is only used to help understand the method and core idea of this disclosure. At the same time, for the general technical personnel in this field, according to the idea of this disclosure, there will be changes in the specific implementation methods and application scope. In summary, the content of this specification should not be understood as the limitation of this disclosure.

The invention claimed is:

1. A video segmentation method, wherein the method comprises:
   acquiring a video frame to be processed in a target-video, and information to be segmented in the video frame to be processed;
   determining a tilt angle corresponding to the video frame to be processed according to the information to be segmented;
   performing correction processing on the video frame to be processed according to the tilt angle, to obtain a corrected video frame; and
   performing image segmentation on the corrected video frame according to the information to be segmented, to determine an image to be played,
   wherein the step of acquiring the video frame to be processed in the target-video, and the information to be segmented in the video frame to be processed comprises:
   acquiring placement information of at least one screen needed in playing the video frame to be processed; and
   determining an image to be segmented in the video frame to be processed according to the placement information.

2. The method according to claim 1, wherein determining the tilt angle corresponding to the video frame to be processed according to the information to be segmented, comprises:
   obtaining the tilt angle corresponding to the video frame to be processed by calculating according to vertex coordinates of two adjacent vertexes in the image to be segmented.

3. The method according to claim 2, wherein performing correction processing on the video frame to be processed according to the tilt angle to obtain a corrected video frame, comprises:
   performing a coordinate system transformation processing on the video frame to be processed to obtain a first converted video frame in a mathematical coordinate system, wherein the mathematical coordinate system takes the center of the image of the video frame to be processed as an origin;
   determining a point to be segmented in the first converted video frame and a segmenting point coordinate corresponding to the point to be segmented according to the information to be segmented and the first converted video frame;
   determining a video central point of the first converted video frame;
   performing rotation processing on the first converted video frame according to the video central point and the tilt angle to obtain the corrected video frame; and
   acquiring a corrected segmenting point corresponding to the point to be segmented in the corrected video frame and a corrected coordinate corresponding to the corrected segmenting point.

4. The method according to claim 3, wherein performing image segmentation on the corrected video frame according to the information to be segmented, to determine an image to be played, comprises:
- performing a coordinate system transformation processing on the corrected video frame to obtain a second converted video frame in an image coordinate system, wherein the image coordinate system takes the point of the upper left corner of the corrected video frame as an origin;
- determining a converted segmenting point corresponding to the corrected segmenting point in the second converted video frame and a converted coordinate corresponding to the converted segmenting point according to the second converted video frame; and
- performing segmentation processing on the second converted video frame according to the converted segmenting point and the converted coordinate to obtain the image to be played.

5. The method according to claim 3, wherein performing rotation processing on the first converted video frame according to the video central point and the tilt angle to obtain the corrected video frame, comprises:
- performing a rotation on the first converted video frame with the video central point as a rotation center and the tilt angle as a rotation angle, to obtain the corrected video frame.

6. The method according to claim 3, wherein at least one edge of the image to be segmented of the corrected video frame is in a horizontal state.

7. The method according to claim 1, wherein determining the image to be segmented in the video frame to be processed according to the placement information, comprises:
- placing at least one screen according to the placement information to obtain an overlapping part between the video frame to be processed and the at least one screen, and regarding the overlapping part as the image to be segmented.

8. The method according to claim 1, wherein, after performing image segmentation on the corrected video frame according to the information to be segmented, to determine an image to be played, the method comprises:
- acquiring the image to be played corresponding to each of the screens; and
- sending the image to be played corresponding to each of the screens to a terminal corresponding to the screen synchronously, to control, by the terminal, each of the screens to play the corresponding image to be played synchronously.

9. A nonvolatile computer-readable storage medium, wherein when the instruction stored in the computer-readable storage medium is executed by a processor in an electronic device, the electronic device is capable to perform the video segmentation method according to claim 1.

10. A computer program, comprising a computer-readable code, when the computer-readable code operates on an electronic device, the electronic device executes the video segmentation method according to claim 1.

11. An electronic device, wherein the device comprises:
- a processor, a memory and a computer program stored in the memory and capable to be executed by the processor, and the computer program is executed by the processor to perform operations comprising:
  - acquiring a video frame to be processed in a target-video, and information to be segmented in the video frame to be processed;
  - determining a tilt angle corresponding to the video frame to be processed according to the information to be segmented;
  - performing correction processing on the video frame to be processed according to the tilt angle, to obtain a corrected video frame; and
  - performing image segmentation on the corrected video frame according to the information to be segmented, to determine an image to be played,
- wherein the operation of acquiring the video frame to be processed in the target-video, and the information to be segmented in the video frame to be processed, comprises:
  - acquiring placement information of at least one screen needed in playing the video frame to be processed; and
  - determining an image to be segmented in the video frame to be processed according to the placement information.

12. The electronic device according to claim 11, wherein the operation of determining the tilt angle corresponding to the video frame to be processed according to the information to be segmented, comprises:
- obtaining the tilt angle corresponding to the video frame to be processed by calculating according to vertex coordinates of two adjacent vertexes in the image to be segmented.

13. The electronic device according to claim 12, wherein the operation of performing correction processing on the video frame to be processed according to the tilt angle to obtain a corrected video frame, comprises:
- performing a coordinate system transformation processing on the video frame to be processed to obtain a first converted video frame in a mathematical coordinate system, wherein the mathematical coordinate system takes the center of the image of the video frame to be processed as an origin;
- determining a point to be segmented in the first converted video frame and a segmenting point coordinate corresponding to the point to be segmented according to the information to be segmented and the first converted video frame;
- determining a video central point of the first converted video frame;
- performing rotation processing on the first converted video frame according to the video central point and the tilt angle to obtain the corrected video frame; and
- acquiring a corrected segmenting point corresponding to the point to be segmented in the corrected video frame and a corrected coordinate corresponding to the corrected segmenting point.

14. The electronic device according to claim 13, wherein the operation of performing image segmentation on the corrected video frame according to the information to be segmented, to determine an image to be played, comprises:
- performing a coordinate system transformation processing on the corrected video frame to obtain a second converted video frame in an image coordinate system, wherein the image coordinate system takes the point of the upper left corner of the corrected video frame as an origin;
- determining a converted segmenting point corresponding to the corrected segmenting point in the second converted video frame and a converted coordinate corresponding to the converted segmenting point according to the second converted video frame; and performing segmentation processing on the second converted video frame according to the converted segmenting point and the converted coordinate to obtain the image to be played.

15. The electronic device according to claim 13, wherein the operation of performing rotation processing on the first converted video frame according to the video central point and the tilt angle to obtain the corrected video frame, comprises:

performing a rotation on the first converted video frame with the video central point as a rotation center and the tilt angle as a rotation angle, to obtain the corrected video frame.

16. The electronic device according to claim 13, wherein at least one edge of the image to be segmented of the corrected video frame is in a horizontal state.

17. The electronic device according to claim 11, wherein the operation of determining the image to be segmented in the video frame to be processed according to the placement information, comprises:

placing at least one screen according to the placement information to obtain an overlapping part between the video frame to be processed and the at least one screen, and regarding the overlapping part as the image to be segmented.

18. The electronic device according to claim 11, wherein, after the operation of performing image segmentation on the corrected video frame according to the information to be segmented, to determine an image to be played, the operations comprise:

acquiring the image to be played corresponding to each of the screens; and sending the image to be played corresponding to each of the screens to a terminal corresponding to the screen synchronously, to control, by the terminal, each of the screens to play the corresponding image to be played synchronously.

* * * * *